United States Patent
Sygnarowicz et al.

(10) Patent No.: US 8,046,135 B2
(45) Date of Patent: Oct. 25, 2011

(54) METHOD AND SYSTEM FOR DETECTING A VEHICLE ROLLOVER, IN PARTICULAR A SOIL TRIP ROLLOVER

(75) Inventors: Daniel Sygnarowicz, Wojnicz (PL); Maciej Meijer, Krakow (PL)

(73) Assignee: Delphi Technologies, Inc., Troy, MI (US)

( * ) Notice: Subject to any disclaimer, the term of this patent is extended or adjusted under 35 U.S.C. 154(b) by 639 days.

(21) Appl. No.: 12/221,456

(22) Filed: Aug. 1, 2008

(65) Prior Publication Data
US 2009/0037057 A1    Feb. 5, 2009

(30) Foreign Application Priority Data
Aug. 2, 2007   (EP) .................................... 07015175

(51) Int. Cl.
*B60R 21/01*    (2006.01)
*B60R 21/13*    (2006.01)
(52) U.S. Cl. ............................ 701/45; 180/282; 280/735
(58) Field of Classification Search .................. 280/735; 701/45–47; 180/282
See application file for complete search history.

(56) References Cited

U.S. PATENT DOCUMENTS

| | | | |
|---|---|---|---|
| 7,460,937 B2 * | 12/2008 | Lahmann et al. | 701/45 |
| 2002/0087235 A1 * | 7/2002 | Aga et al. | 701/1 |
| 2004/0254707 A1 * | 12/2004 | Lu et al. | 701/70 |
| 2006/0229783 A1 * | 10/2006 | Lahmann et al. | 701/45 |

FOREIGN PATENT DOCUMENTS
DE     10303149     7/2004

* cited by examiner

*Primary Examiner* — Ruth Ilan
(74) *Attorney, Agent, or Firm* — Thomas N. Twomey

(57) ABSTRACT

A method and system for detecting a vehicle rollover or dangerous situations that may precede a rollover, in particular a soil trip type rollover includes the following steps, where the steps are performed in loops,
 (a) determining a lateral acceleration of the vehicle,
 (b) calculating an acceleration differential value on the basis of the lateral accelerations determined in at least two steps (a),
 (c) determining a possibility of a rollover of the vehicle on the basis of the lateral acceleration determined in at least one step (a) and the acceleration differential value calculated in at least one step (b),
 (d) generating an output activation signal at least on the basis of a possibility of a rollover of the vehicle determined in a step (c).

9 Claims, 7 Drawing Sheets

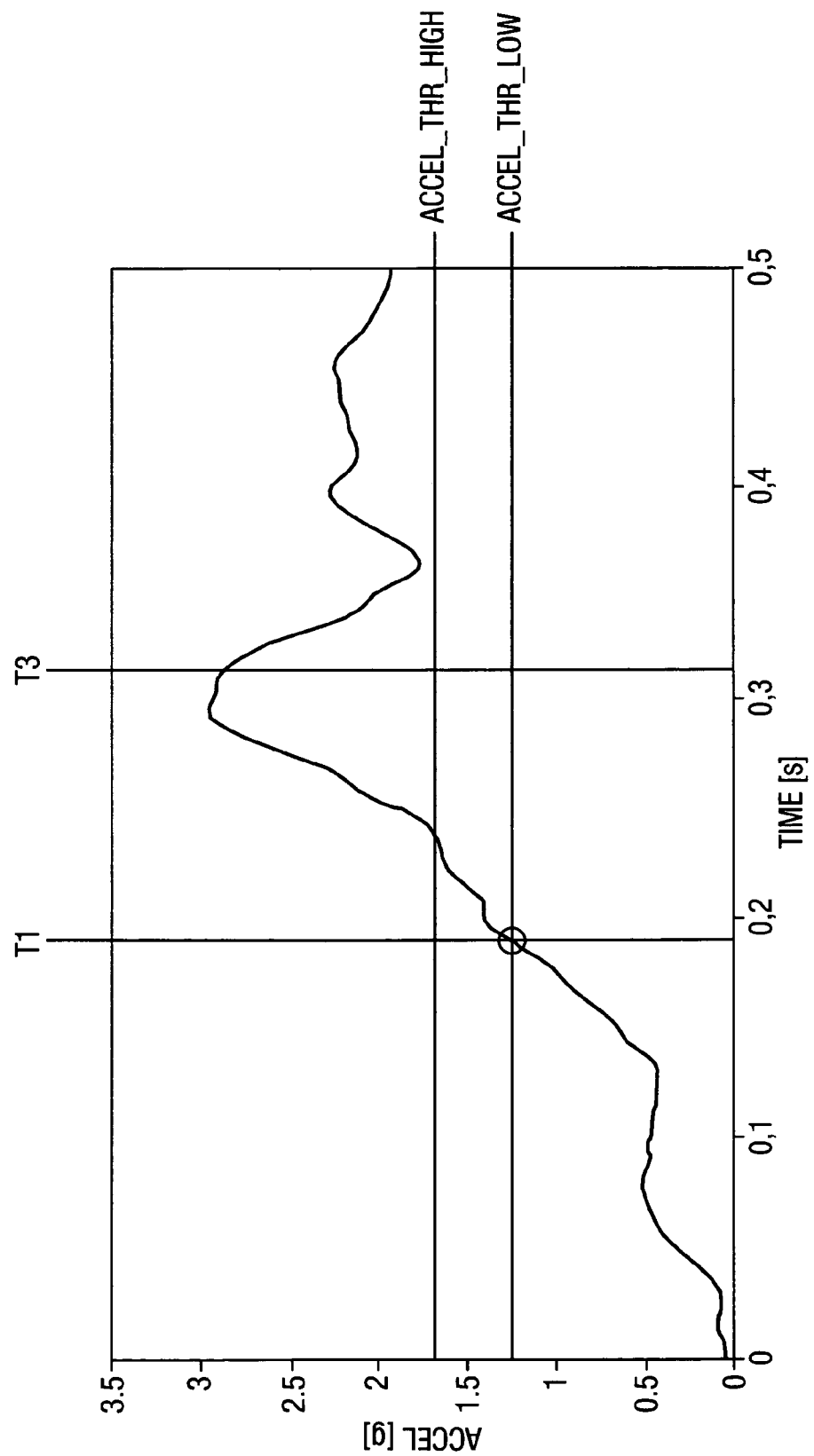

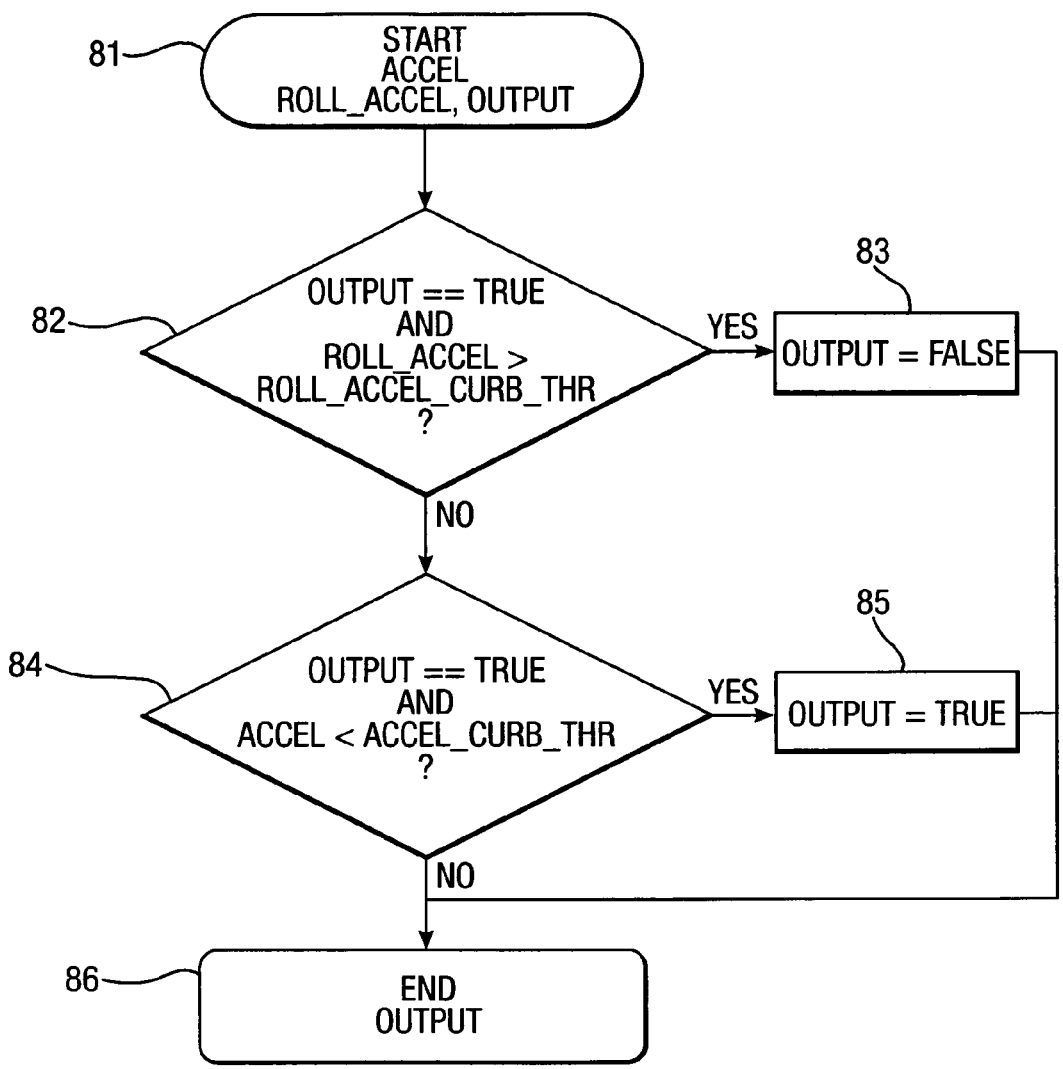

METHOD AND SYSTEM FOR DETECTING A VEHICLE ROLLOVER, IN PARTICULAR A SOIL TRIP ROLLOVER

TECHNICAL FIELD

The present invention relates to a method and system for detecting a vehicle rollover or dangerous situations that may precede a rollover, in particular a soil trip type rollover.

BACKGROUND OF THE INVENTION

The purpose of the rollover detection system is to activate protection devices such as seat belts pretensioners, pop-up rollover bars or air bags, protecting occupants of a vehicle during rollover accidents.

Rollover occurrences may be categorized by various types. For example a fall-over or flip-over occurs when one wheel of the vehicle goes respectively excessively down or excessively up when the vehicle travels so that it rolls over. Most of the current algorithms for detecting these types of rollover use an angular rate sensor (ARS) to measure the vehicle roll rate and to calculate the vehicle roll angle (inclination) with respect to the horizontal plane by integrating the roll rate signal. On the basis of the roll rate and roll angle, these algorithms compare the kinetic energy of the vehicle to known rollover and non-rollover events (or to positional energy) in order to asses the rollover probability. Examples of such solutions are disclosed in U.S. Pat. No. 6,584,388 or 6,535,800. In case of a fall-over or flip-over it is sufficient if the vehicle protection devices are activated at the beginning of the rolling over process.

Another rollover type is a trip-over such as curb-trip or soil-trip event that occurs some time after the vehicle sideslips. In this case vehicle passengers are subjected to dangerous high lateral acceleration before the vehicle starts rolling, so that the vehicle protection devices should be activated much earlier before the actual rollover, in order to avoid injuring passengers by for example hitting against vehicle's pillars or window glass. However, the methods employing only the ARS sensor signal activate safety restraints late, during rollover events where the high lateral acceleration is present. The reason is that during trip-over, lateral acceleration creates torque acting on the car and this kinetic energy transforms into rotational energy, which is usually not taken into account by known methods. Although some rollover algorithms use the lateral acceleration signal in the sensing path, in most cases it is employed only in safing logics or to increase the estimated roll angle accuracy. To shorten the activation of protection devices, it has been proposed in a rollover judging device disclosed in patent application US 2005/0159864 to employ a differential value of an acceleration of the vehicle in a lateral direction and to judge the possibility of a trip-type rollover of the vehicle on the basis of at least one of a roll rate and a roll angle achieved by integrating the roll rate, and at least the acceleration differential value.

However there is still a need to provide a vehicle rollover detection means that would guarantee shorter deployment times for safety restraints during rollover accident and in particular during a soil trip rollover type.

SUMMARY OF THE INVENTION

The object of the present invention is to provide an uncomplicated and inexpensive method and system, in particular for detecting a vehicle soil trip type rollover event which might be easily implemented e.g. in existing microcontroller or other system of the vehicle and which might employ the signals from existing sensors. The proposed method is a consequence of detailed studies of a trip type vehicle rollover phenomenon carried out by the inventors.

According to the present invention there is provided a novel method of detecting a vehicle rollover and in particular a soil trip rollover, comprising the steps of
 (a) determining a lateral acceleration of the vehicle,
 (b) calculating an acceleration differential value on the basis of the lateral accelerations determined in at least two steps (a),
 (c) determining a possibility of a rollover of the vehicle on the basis of the lateral acceleration determined in at least one step (a) and the acceleration differential value calculated in at least one step (b),
 (d) generating an output activation signal at least on the basis of a possibility of a rollover of the vehicle determined in a step (c), where the steps are performed in loops.

Preferably a possibility of a rollover of the vehicle is determined in a step (c) on the basis of the lateral accelerations of the vehicle determined in at least two steps (a) and acceleration differential values calculated in at least two steps (b). Thanks to that to activate the logic the lateral acceleration and acceleration differential value variations are verified in some time frame, so that possibility of a rollover of the vehicle is determined more reliably.

Preferably the acceleration differential value is calculated in a current step (b) as a difference between the lateral acceleration of the vehicle value determined in current step (a) and the lateral acceleration of the vehicle determined in at least one of the previous steps (a). This is a simplest, yet efficient way to determine slope of the vehicle, which is time independent as intervals between the subsequent steps remain the same.

Preferably in the method according to the present invention, step (c) comprises the consecutive steps of:
 (i) setting a first flag if it is unset and the acceleration differential value calculated in a step (b) is higher than a predefined first slope threshold,
 (ii) setting a second flag if it is unset and the first flag is set and the acceleration differential value calculated in a step (b) is lower than a predefined second slope threshold and the lateral acceleration of the vehicle determined in a step (a) is higher than a predefined second acceleration threshold,
 (iii) setting a third flag if it is unset and the second flag is set and the acceleration differential value calculated in a step (b) is higher than a predefined third slope threshold,
 which steps are performed consecutively as long as the vehicle lateral acceleration value determined in a step (a) exceeds a predefined first acceleration threshold and if the lateral acceleration of the vehicle determined in a step (a) is lower than the predefined first acceleration threshold, all the flags are unset,
 while a rollover of the vehicle is determined as possible in a step (c) as long as the third flag is set.

In this case preferably all the flags are additionally unset if the acceleration differential value calculated in a step (b) is negative and the third flag is set.

Preferably the method of the present invention comprises additional step (e) of determining the roll acceleration of the vehicle and additional step (f) of determining a possibility of a rollover of the vehicle on the basis of the roll acceleration of the vehicle determined in at least one step (e) and lateral acceleration of the vehicle determined in at least one step (a), where the output activation signal is generated in step (d) additionally on the basis of a possibility of a rollover of the vehicle determined in a step (f).

In such a case step (f) preferably comprises the consecutive steps of (i) unsetting a fourth flag if it is set and the roll acceleration of the vehicle determined in a step (e) is higher than a predefined roll acceleration threshold, and (ii) setting the fourth flag if it is unset and the lateral acceleration of the vehicle determined in a step (a) is lower than a third predefined acceleration threshold, while a rollover of the vehicle is determined as possible in a step (f) as long as the fourth flag is set.

Preferably the first flag, the second flag and the third flag are initially unset and the fourth flag is initially set.

Preferably at least one of the values determined in a step (a) or a step (e) or calculated in a step (b) is preprocessed, where preprocessing preferably involves at least signal scaling, removing a signal drift and/or filtering a signal.

Furthermore the method according to the present invention preferably comprises the step of activation at least one protection device for an occupant of the vehicle on the basis of the output activation signal generated in step (d).

According to the present invention there is also provided a system of detecting a vehicle rollover implementing at least one of the features of the method described above.

BRIEF DESCRIPTION OF THE DRAWINGS

The invention is presented below with reference to exemplary embodiment and drawings in which:

FIG. 5 shows a flowchart of one exemplary embodiment of a curb detector block shown in FIG. 1.

DESCRIPTION OF THE PREFERRED EMBODIMENT

Figure 1:
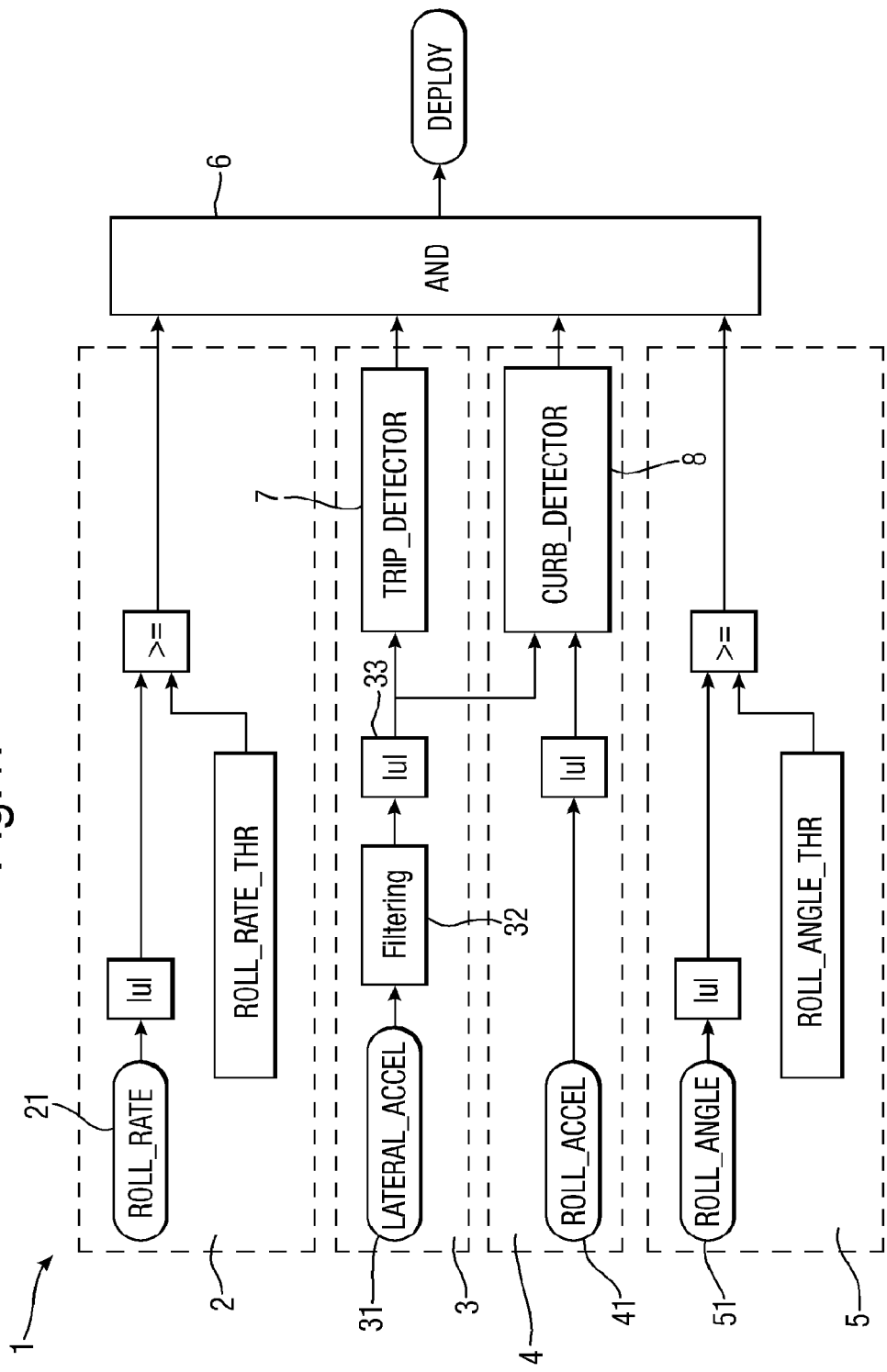
FIG. 1 shows a block diagram of exemplary logic representing practical implementation of the system according to the invention.

An exemplary microcontroller implementation of the present invention is shown in FIG. 1 as a modular system comprising four processing paths cross linked with each other as described below. The logic 1 may be a subcomponent or a functional block of a rollover determination system connected to appropriate sensors. Usually only two sensors are required: a roll rate sensor and a lateral acceleration sensor. The roll angle signal is commonly calculated by the rollover determination system at the earlier stages of signal processing on the basis of discrete integration of the signal obtained from a roll rate sensor, while the roll acceleration is calculated on the basis of the roll rate e.g. as a differential value of the latter. The four activation paths 2, 3, 4 and 5 of the logic 1 are connected to an AND gate 6, so that if all the paths 2, 3, 4 and 5 are simultaneously active the logic activates, which may be a direct signal to deploy the vehicle protection devices. Obviously, the logic 1 may also be a subcomponent of the larger rollover determination system.

The input of the first path 2 is the vehicle roll rate signal 21 and the path 2 activates if the absolute value of this signal exceeds the predefined threshold (ROLL_RATE_THR). Similarly, the fourth path 5 activates if the absolute value of the vehicle roll angle value 51 exceeds the predefined threshold (ROLL_ANGLE_THR). The input of the second path 3 is the vehicle lateral acceleration signal 31, which is low pass filtered in a block 32 with a cut-off frequency of about 30 Hz and its absolute value is provided by a block 33 to a block 7 (TRIP_DETECTOR) which judges whether a trip-type rollover situation occurs. The principles of operation of the block 7 shall be discussed in detail with reference to FIG. 2. Absolute value of the vehicle roll acceleration along with a signal provided by the block 33 are the inputs of a block 8 (CURB_DETECTOR) of the third activation path 4. The aim and principles of operation of the block 8 shall be described later in detail with reference to FIG. 5. In general, the first 2, third 4 and fourth path 5 improve the reliability of the block 7 and prevent against inadvertent deployment of the vehicle protection devices during aggressive driving or any other kind of non-rollover events.

Figure 2:
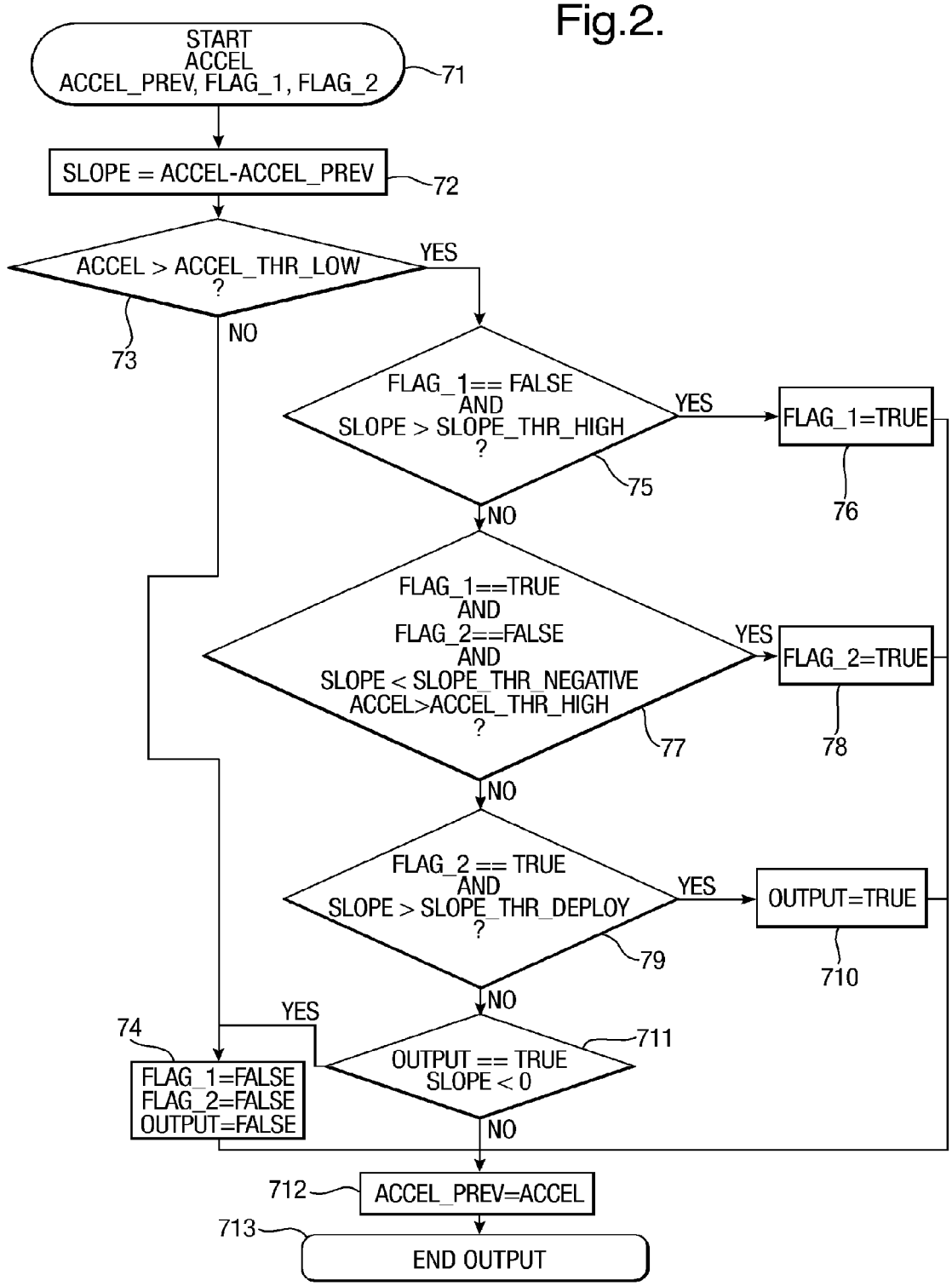
FIG. 2 shows a flowchart of an exemplary embodiment of a trip detector block shown in FIG. 1.

An exemplary and relatively simple implementation of the TRIP_DETECTOR block 7 is presented in the form of a flowchart in FIG. 2. One of the inputs (block 71) of the block 7 is the vehicle lateral acceleration real and positive value (ACCEL) provided by the block 33 shown in FIG. 1. The OUTPUT (block 713) of the block 7 is the signal indicating the high possibility of a trip rollover of the vehicle. Further, the inputs of the algorithm shown in FIG. 2 are Boolean (i.e. TRUE or FALSE) control flags FLAG_1 and FLAG_2, as well as previous ACCEL value (ACCEL_PREV) and previous OUTPUT state, as used in the previous algorithm loop. With respect to the operation of the TRIP_DETECTOR block, the OUTPUT may also be regarded as a third Boolean control flag. All these values are stored in the system between subsequent algorithm loops and initially (e.g. while the vehicle engine starts) are zeroed. Further for its operation, the algorithm employs five predefined thresholds (ACCEL_THR_LOW, SLOPE_THR_HIGH, SLOPE_THR_NEGATIVE, ACCEL_THR_HIGH and SLOPE_THR_DEPLOY). The principles of operation of the algorithm 7 shall be explained below and with reference to FIG. 3 (rollover characteristic) and FIG. 4 (non-rollover characteristic).

At the first stage of algorithm operation (assignment block 72) the differential value (SLOPE) of the lateral acceleration of the vehicle is calculated. In the simplest case, this value may be provided as a difference between two consecutive ACCEL samples (SLOPE=ACCEL−ACCEL_PREV). The SLOPE is also multiplied by a constant to give more flexible values of the slope for calibration purposes.

Subsequently, a decision block 73 examines if the ACCEL remains below a predefined first acceleration threshold (ACCEL_THR_LOW) and if so both flags (FLAG_1 and FLAG_2) and the OUTPUT are unset (i.e. set to FALSE) by an assignment block 74.

If the ACCEL value however is higher than ACCEL_THR_LOW, the algorithm flow is transferred to a decision block 75 that examines the state of the FLAG_1 and the SLOPE value. If the SLOPE exceeds a predefined first slope threshold value (SLOPE_THR_HIGH) and simultaneously FLAG_1 is unset, then FLAG_1 is set by an assignment block 76. In this point, the lateral acceleration acting on the vehicle rapidly increases, which may indicate the actual start of the vehicle trip.

If the conditions examined by the decision block 75 have not been satisfied, the algorithm flow is transferred to a decision block 77. The block 77 examines the state of FLAG_1 (i.e. if the trip has started), as well as if the SLOPE is lower than a predefined second slope threshold (SLOPE_THR_NEGATIVE) and the ACCEL is larger than a predefined second acceleration threshold (ACCEL_THR_HIGH). Meeting all of these conditions indicates that the ACCEL value, though rapidly decreasing still remains high, so that the FLAG_2 is appropriately set. This is an extreme situation almost certainly indicating that the rollover process has begun, i.e. a part of the vehicle sideslip energy in now converted into energy of the rotational movement of the vehicle.

Finally, the algorithm flow is transferred to a decision block 79 examining the state of the FLAG_2 and the algorithm deployment condition that is when SLOPE is larger than a predefined third slope threshold (SLOPE_THR_DEPLOY). If so, the OUTPUT value is set by an assignment block 710. In this moment lateral acceleration increases again since too large amount of sideslip energy have been converted into rotational energy during a very short time period and one may surely state that the vehicle has lost dynamic stability and is now rolling.

After setting the OUTPUT, it is advantageous to maintain its setting state until the end of the rollover event. This condition is obtained by means of a block 711 which maintains the TRUE state of the OUTPUT as long as it is set and SLOPE is above 0. If SLOPE decreases below zero, the rollover event has almost been finished which results in unsetting both flags FLAG_1, FLAG_2 and the OUTPUT by an assignment block 74. It is particularly important if the logic 1 is a subcomponent of the larger rollover determination system.

Regardless of the flow of the algorithm in the last stage of its processing, the previous acceleration value is set by an assignment block 712. As may be contemplated from FIG. 2, for setting the OUTPUT at least three algorithm loops are necessary:

the first loop through the blocks 73, 75 and 76 to activate the FLAG_1;

the second loop through the blocks 73, 75, 77 and 78 to activate the FLAG_2; and the third loop through the blocks 73, 75, 77, 79 and 710.

More loops may also take place as the algorithm flow may run a few times through any of the first, second or third subsequent loop, as defined above. Obviously, the algorithm flow may also run a few times on a "zero" loop not meeting the conditions of the blocks 73, 75, 77, 79 and 711. In any moment however the ACCEL drops below ACCEL_THR_LOW (block 73), the flags are unset (block 74) and the process needs to be started all over again.

Figure 3B:
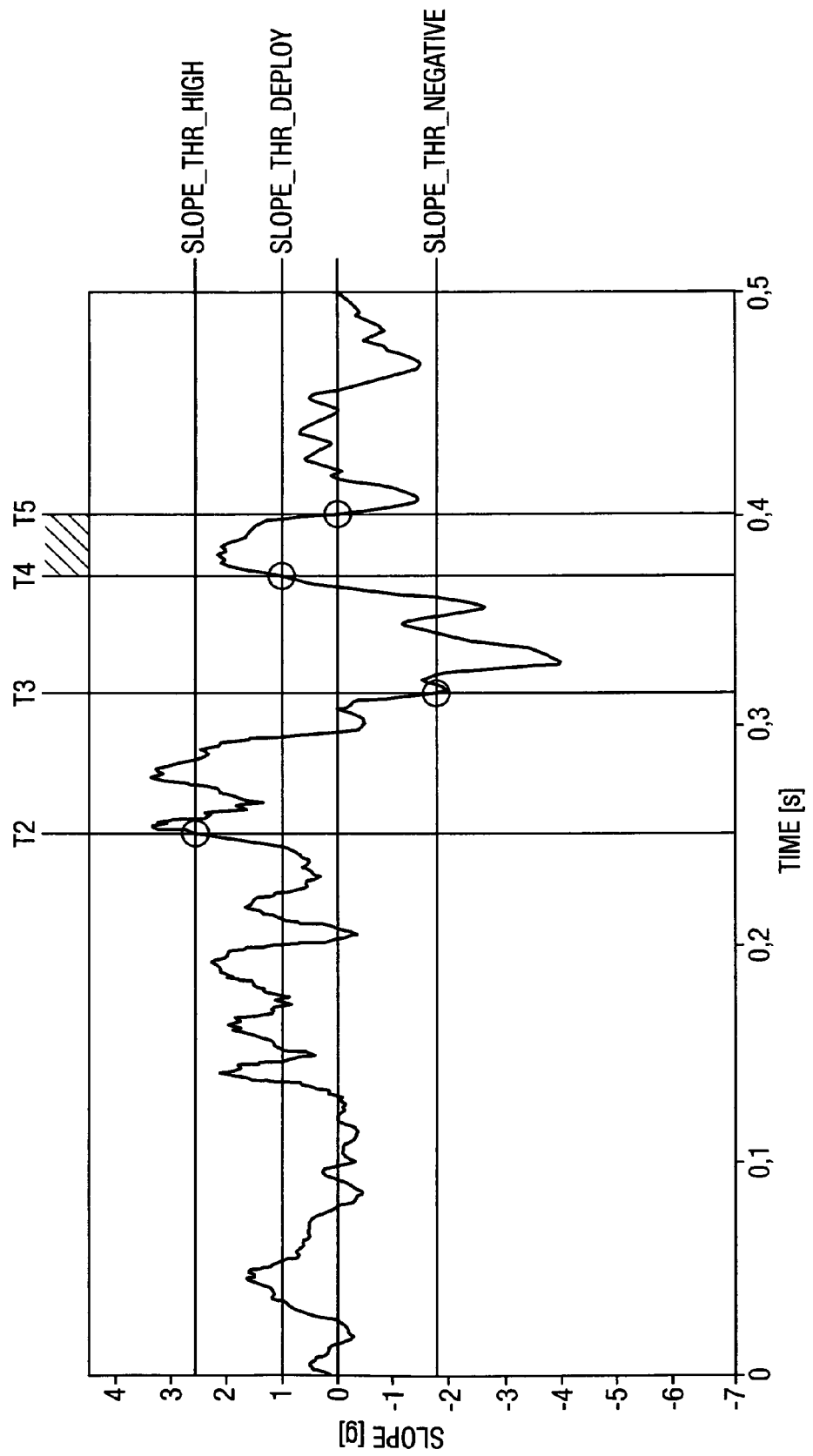
FIG. 3 shows an exemplary time course of the vehicle lateral acceleration and slope signals during a trip-type rollover.
Figure 4A:
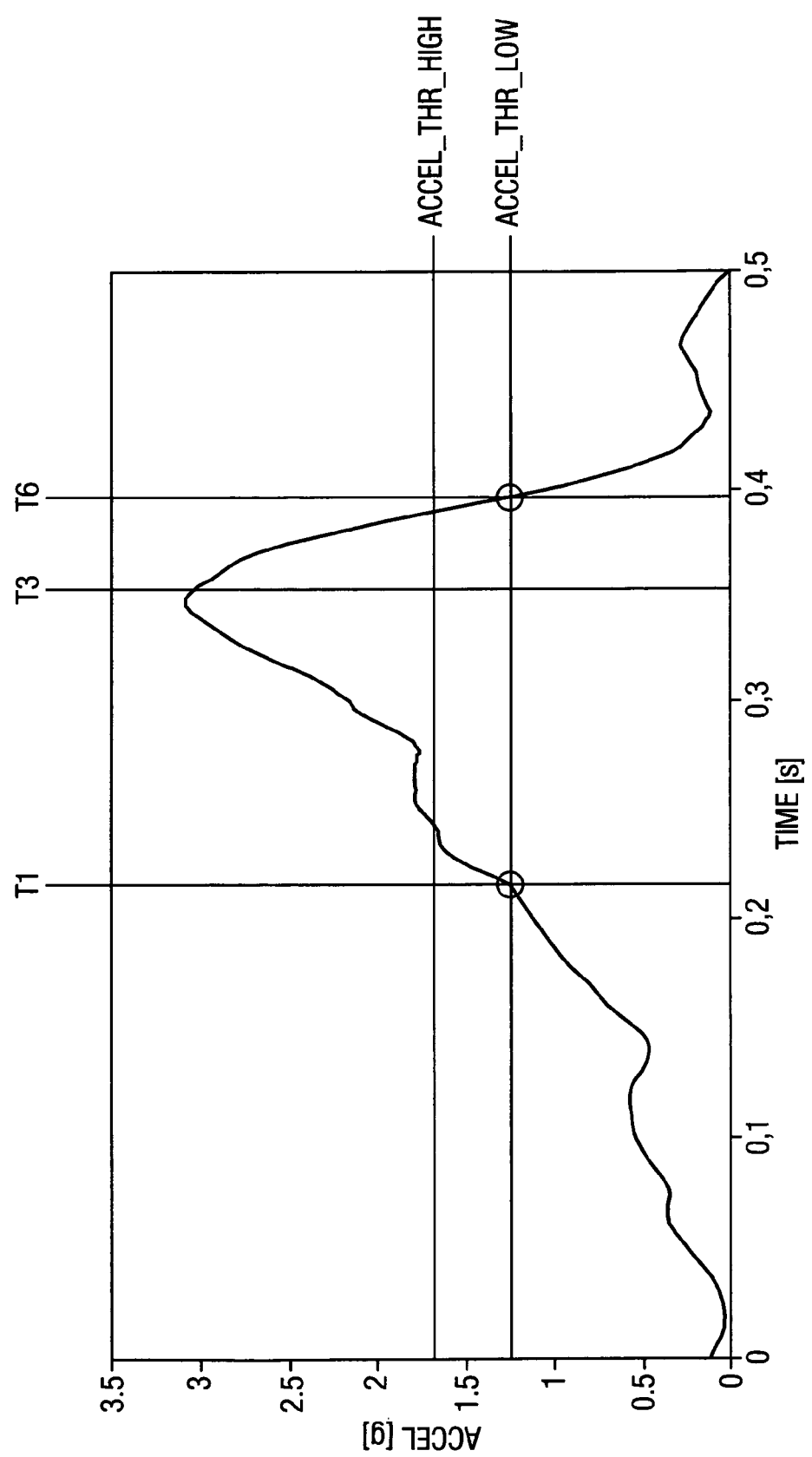
FIG. 4 shows an exemplary time course of the vehicle lateral acceleration and slope signals during a near rollover event.
Figure 4B:
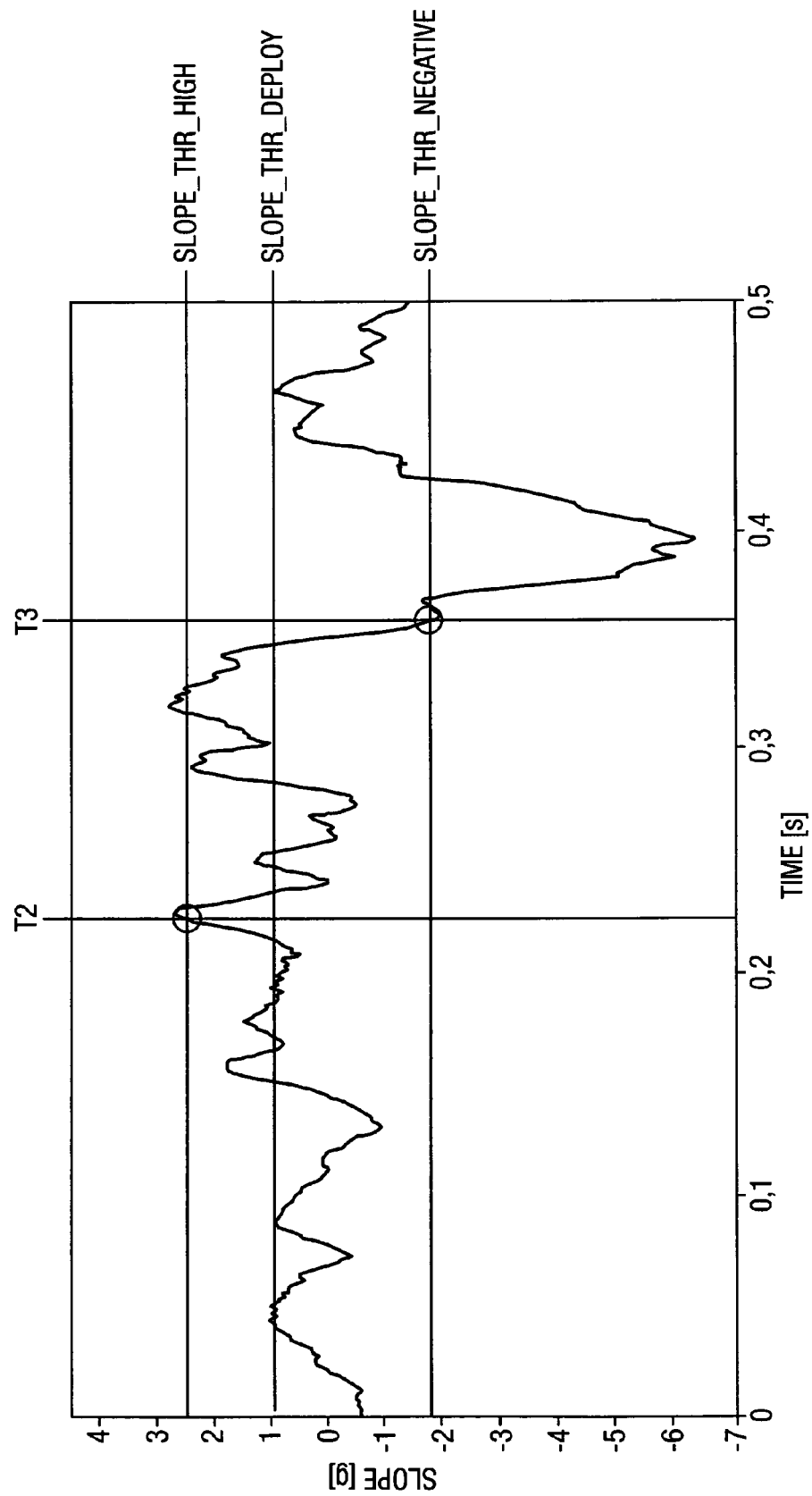

The operation of the TRIP_DETECTOR block 7 shown in FIG. 1 and explained in FIG. 2 shall be discussed with reference to FIGS. 3 and 4, showing exemplary characteristics of the ACCEL (FIGS. 3a and 4a) and SLOPE (FIGS. 3b and 4b) values for the rollover and no-rollover case respectively, along with exemplary thresholds values employed by decisive blocks of the algorithm from FIG. 2. The acceleration data shown was measured during actual crash tests.

Referring now to FIGS. 3a and 3b, it is visible that at the moment T1 the ACCEL exceeds the ACCEL_THR_LOW value set to about 1.25 g. At this point, the processing flow is transferred to the block 75, but since the SLOPE still remains below the SLOPE_THR_HIGH of about 2.5 g, the FLAG_1 shall be set only in one of subsequent algorithm loops at the moment T2. After some loops with FLAG_1 set, when at the moment T3 the SLOPE drops below the SLOPE_THR_NEGATIVE (about −1.8 g) while the ACCEL is still above ACCEL_THR_HIGH (about 1.7 g) the activation conditions of the block 77 shall be satisfied and the FLAG_2 shall be set by the block 78. After another few "zero" loops with FLAG_2 set, the OUTPUT of the algorithm shall be set by the block 710 when the SLOPE exceeds the SLOPE_THR_DEPLOY (about 0.99 g) activation condition of the block 79 at the moment T4. TRUE state of the OUTPUT shall be maintained by the block 711 in subsequent algorithm loops until the moment T5 after which the SLOPE decreases below 0 and the OUTPUT is unset.

FIGS. 4a and 4b show an exemplary ACCEL and SLOPE characteristics that indicate dangerous near rollover situation, in which however the protection devices should not be deployed. The threshold values correspond to those indicated in FIG. 3. As shown, at the moment T1 the ACCEL exceeds the ACCEL_THR_LOW value so that the processing is transferred to the "zero" loop, where in the moment T2 the SLOPE exceeds the SLOPE_THR_HIGH and the FLAG_1 is set the block 76. Subsequently, at the moment T3 the SLOPE decreases below the SLOPE_THR_NEGATIVE, while the ACCEL remains above ACCEL_THR_HIGH so that the FLAG_2 is set by the block 78. However, in the moment T5 the ACCEL rapidly decreases below the ACCEL_THR_LOW, so that the flow is transferred to the block 74 where both the FLAG_1 and FLAG_2 are unset.

Comparing characteristics shown in FIG. 3a and FIG. 4a one may see that though in both cases (rollover vs. no-rollover) the ACCEL increases to some maximum, during trip-type rollovers it does not drop to zero (as in FIG. 4a) but after a short decrease period it starts increasing again to reach some second maximum. Therefore one of the differences between sideslips and trip-type rollovers is this distinctive saddle section of the lateral acceleration (ACCEL) signal.

Though the saddle section may be described by its two maximums and one minimum, a trip-type rollover depends, among others, on the type of the vehicle and soil terrain and may occur for acceleration values from relative wide range. It is thus impossible to predefine an appropriate set of thresholds reflecting the saddle extremes for all possible rollover events and to detect a trip type rollover only on the basis of successive exceeding each of these thresholds by lateral acceleration value.

Therefore to detect a rollover, a time derivative (SLOPE) of the lateral acceleration is analyzed, so that a saddle section shall be confirmed if the sign of this value changes three times in a row. To prevent inadvertent activation, these sign changes are also confirmed by the SLOPE exceeding appropriate thresholds.

An exemplary implementation of the block 8 of the logic 1 from FIG. 1 is presented in a form of a flowchart in FIG. 5. The aim of this block is to prevent the protection devices deployment, in cases where a rapid change of the vehicle roll rate is detected, which is a characteristic feature of curb trips belonging to the group of no deploy events. The curb trips events differ to soil trips, which in turn may lead to rollover, in their dynamics, so that to separate curb and soil trips, the roll acceleration is measured. For the curb trip event, the roll rate increases abruptly and rapidly (in about 80-180 ms), while for the soil trip the increase of the roll rate is relatively slower.

The inputs (block 81) of the block 8 are an absolute value of a roll acceleration ROLL_ACCEL signal calculated for example as a difference between two consecutive roll rate samples, an absolute value of a low pass filtered lateral acceleration of the vehicle provided by the block 33 shown in FIG. 1 and the output of the block 8 as determined in a previous algorithm loop (block 86) which is initially set to TRUE.

If the previous OUTPUT value is set and the ROLL_ACCEL value exceeds the ROLL_ACCEL_CURB_THR (activation condition of a block 82), the OUTPUT shall be unset by an assignment block 83. Consequently, the output of the logic 1 is also unset. On the other hand if the OUTPUT is unset and the lateral acceleration of the vehicle drops below the predefined threshold LOW_ACCEL_THRESHOLD the OUTPUT is set by an assignment block 85. In any other case the previous output state is maintained. The OUTPUT may also be regarded as a fourth Boolean control flag.

Table 1 below shows preferred ranges of calibration parameters of the logic 1 shown in FIG. 1. The right choice of these parameters depends on a number of factors e.g. a wheel track, a mass, a position of a centre of gravity, or a moment of inertia of the vehicle.

TABLE 1

| Block | Calibration parameter | Preferred range |
| --- | --- | --- |
| 7 | ACCEL_THR_LOW | 0.7 to 1.8 [g] |
| 7 | ACCEL_THR_HIGH | 1.2 to 3.0 [g] |
| 7 | SLOPE_THR_HIGH | 2 to 10 [g] |
| 7 | SLOPE_THR_NEGATIVE | 0.0 to 2.0 [g] |
| 7 | SLOPE_THR_DEPLOY | 0.0 to 1.0 [g] |
| 1 | ROLL_RATE_THR | 10-40 [deg/s] |
| 1 | ROLL_ANGLE_THR | 2-10 [deg] |
| 8 | ROLL_ACCEL_CURB_THR | 8-30 [deg/s] |
| 8 | ACCEL_CURB_THR | 0.8-1.5 [g] |

The method of the invention may be easily implemented as software of the microcontroller, being the part of the same electronic control unit (ECU), that the sensors are generally installed. Usually the sensors of the ECU include angular rate sensor (ARS) and other types of sensors such as accelerometers, measuring the lateral or vertical acceleration of the vehicle. It should be also understood, that other, in particular software implementations of the invention are possible as well.

The invention claimed is:

1. A method of detecting a vehicle rollover comprising the steps of:
    (a) determining a lateral acceleration of the vehicle;
    (b) calculating an acceleration differential value on the basis of the lateral accelerations determined in at least two steps (a);
    (c) determining a possibility of a rollover of the vehicle on the basis of the lateral acceleration determined in at least one step (a) and the acceleration differential value calculated in at least one step (b); and
    (d) generating an output activation signal at least on the basis of a possibility of a rollover of the vehicle determined in a step (c), wherein the steps are performed in loops,
    wherein a possibility of a rollover of the vehicle is determined in a step (c) on the basis of the lateral accelerations of the vehicle determined in at least two steps (a) and acceleration differential values calculated in at least two steps (b).

2. The method according to claim 1, characterized in that, the acceleration differential value is calculated in current step (b) as a difference between the lateral acceleration of the vehicle value determined in current step (a) and the lateral acceleration of the vehicle determined in at least one of the previous steps (a).

3. The method according to claim 1, further comprising activating at least one protection device for an occupant of the vehicle on the basis of the output activation signal generated in step (d).

4. A method of detecting a vehicle rollover comprising the steps of:
    (a) determining a lateral acceleration of the vehicle;
    (b) calculating an acceleration differential value on the basis of the lateral accelerations determined in at least two steps (a);
    (c) determining a possibility of a rollover of the vehicle on the basis of the lateral acceleration determined in at least one step (a) and the acceleration differential value calculated in at least one step (b); and
    (d) generating an output activation signal at least on the basis of a possibility of a rollover of the vehicle determined in a step (c), wherein the steps are performed in loops,
    wherein step (c) comprises the consecutive steps of:
        (i) setting a first flag if it is unset and the acceleration differential value calculated in a step (b) is higher than a predefined first slope threshold,
        (ii) setting a second flag if it is unset and the first flag is set and the acceleration differential value calculated in a step (b) is lower than a predefined second slope threshold and the lateral acceleration of the vehicle determined in a step (a) is higher than a predefined second acceleration threshold,
        (iii) setting a third flag if it is unset and the second flag is set and the acceleration differential value calculated in a step (b) is higher than a predefined third slope threshold, which steps are performed consecutively as long as the vehicle lateral acceleration value determined in a step (a) exceeds a predefined first acceleration threshold and if the lateral acceleration of the vehicle determined in a step (a) is lower than the predefined first acceleration threshold, all the flags are unset, while a rollover of the vehicle is determined as possible in a step (c) as long as the third flag is set.

5. The method according to claim 4, characterized in that, all the flags are additionally unset if the acceleration differential value calculated in a step (b) is negative and the third flag is set.

6. A method of detecting a vehicle rollover comprising the steps of:
    (a) determining a lateral acceleration of the vehicle;
    (b) calculating an acceleration differential value on the basis of the lateral accelerations determined in at least two steps (a);
    (c) determining a possibility of a rollover of the vehicle on the basis of the lateral acceleration determined in at least one step (a) and the acceleration differential value calculated in at least one step (b);
    (d) generating an output activation signal at least on the basis of a possibility of a rollover of the vehicle determined in a step (c);
    (e) determining the roll acceleration of the vehicle;
    (f) determining a possibility of a rollover of the vehicle on the basis of the roll acceleration of the vehicle determined step (e) and lateral acceleration of the vehicle determined in step (a), where the output activation signal is generated in step (d) additionally on the basis of a possibility of a rollover of the vehicle determined in a step (f), wherein the steps are performed in loops,
    wherein step (f) comprises the consecutive steps of
        (i) unsetting a fourth flag if it is set and the roll acceleration of the vehicle determined in a step (e) is higher than a predefined roll acceleration threshold, and
        (ii) setting the fourth flag if it is unset and the lateral acceleration of the vehicle determined in a step (a) is lower than a third predefined acceleration threshold, while a rollover of the vehicle is determined as possible in a step (f) as long as the fourth flag is set.

7. The method according to claim 6, characterized in that, a first flag, a second flag and a third flag are initially unset and the fourth flag is initially set.

8. The method according to claim 6, characterized in that, at least one of the values determined in a step (a) or a step (e) or calculated in a step (b) is preprocessed, where preprocessing involves at least signal scaling, removing a signal drift and/or filtering a signal.

9. A system of detecting a vehicle rollover comprising
(a) means for determining a lateral acceleration of the vehicle,
(b) means for calculating an acceleration differential value on the basis of the lateral accelerations determined in at least two steps (a),
(c) means for determining a possibility of a rollover of the vehicle on the basis of the lateral acceleration determined in at least one step (a) and the acceleration differential value calculated in at least one step (b),
(d) means for generating an output activation signal at least on the basis of a possibility of a rollover of the vehicle determined in a step (c),
where the steps are performed in loops,
wherein a possibility of a rollover of the vehicle is determined in a step (c) on the basis of the lateral accelerations of the vehicle determined in at least two steps (a) and acceleration differential values calculated in at least two steps (b).

\* \* \* \* \*